US006872779B2

(12) United States Patent
Mori et al.

(10) Patent No.: US 6,872,779 B2
(45) Date of Patent: Mar. 29, 2005

(54) POLYMERIC FLOCCULANT AND METHOD OF SLUDGE DEHYDRATION

(75) Inventors: Yoshio Mori, Nagoya (JP); Minoru Azuchi, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 169 days.

(21) Appl. No.: 10/168,212

(22) PCT Filed: Dec. 20, 2000

(86) PCT No.: PCT/JP00/09042

§ 371 (c)(1),
(2), (4) Date: Jun. 19, 2002

(87) PCT Pub. No.: WO01/46281

PCT Pub. Date: Jun. 28, 2001

(65) Prior Publication Data

US 2003/0042209 A1 Mar. 6, 2003

(30) Foreign Application Priority Data

Dec. 21, 1999 (JP) ............................................. 11-363314
Mar. 30, 2000 (JP) ....................................... 2000-094115
Jun. 30, 2000 (JP) ....................................... 2000-198837

(51) Int. Cl.$^7$ ........................... C08F 283/06; C08F 4/04
(52) U.S. Cl. ....................... 525/118; 525/162; 525/258; 525/260; 526/219.6; 526/219.5; 524/555; 524/801
(58) Field of Search ................................ 525/118, 162, 525/258, 260; 526/219.6, 219.5; 524/555, 801

(56) References Cited

U.S. PATENT DOCUMENTS

| | | | | | |
|---|---|---|---|---|---|
| 4,960,465 | A | * | 10/1990 | Arfaei | ......................... 106/724 |
| 4,981,936 | A | * | 1/1991 | Good et al. | .................. 526/287 |
| 5,182,331 | A | | 1/1993 | Liao et al. | |
| 5,886,109 | A | | 3/1999 | Kitano et al. | |

FOREIGN PATENT DOCUMENTS

| | | |
|---|---|---|
| DE | 23 13 189 | 9/1973 |
| EP | 0 469 196 A1 | 2/1992 |
| JP | 42-1729 | 1/1967 |
| JP | 49-41281 | 4/1974 |
| JP | 58-51998 | 3/1983 |
| JP | 59-16599 | 1/1984 |
| JP | 63-158200 | 7/1988 |
| JP | 9-1192 | 1/1997 |
| JP | 11-156400 | 6/1999 |
| WO | WO 99/46207 A1 | 9/1999 |

OTHER PUBLICATIONS

Th. F. Tadros, et al. "Application of Depletion Flocculation for Prevention of Formation of Dilatant Sediments." Colloids and Surfaces. vol. 43. Pp. 105–116, 1990.
XP–002270397, Xiao Huining et al, "Novel non–ionic polymeric flocculants for mechanical pulps: An overview", Proceedings of the 1997 11$^{th}$ Fundmental Research Symposium, Part2, Cambridge, UK (Sep. 1997) (abstract only—1 page).
XP–002270395. R. Walz et al., "Monomeric and Polymeric Azoinitiators", Makromol. Chem. 178, pp. 2527–2534 (1977).
XP–002270396, Jadwiga Matuszewska–Czerwik et al., "Template photopolymerization of methacrylic acid–III. Determination of the rate constants ratio kt/kp for elementary processes", European Polym. J., vol. 27, No. 8, pp. 743–746 (1991).
XP–002270398,—abstract of JP 11–156400 (Kurita Water Ind. Ltd.)—(abstract only–1 pg.).
XP–000802360, Shogo Nishi et al., "Basic Fibroblast Growth Factor Impregnated Hydrogel Microspheres for Embolization of Cerebral Arteriovenous Malformations", ASA10 Journal 1998, pp. M405–M410.
XP–009025927, Akira Ueda et al., "Block Copolymers Derived from Azobiscyanopentanoic Acid. V. Block Copolymerization Initiated with a Polyethylene Glycol Containing Scissile Azo Linkages in its Main Chain", Journal of Polymer Science, vol. 25, pp. 3495–3498 (1987).
European Search Report dated Mar. 10, 2004 for Application No. EP 00 98 5802.

* cited by examiner

Primary Examiner—James J. Seidleck
Assistant Examiner—Olga Asinovsky
(74) Attorney, Agent, or Firm—Sughrue Mion, PLLC

(57) ABSTRACT

The invention provides a flocculant which in sludge dewatering gives flocs having an excellent balance among flocculating strength, filtration rate and moisture content, and a method of sludge dewatering with the flocculant.

Namely, the flocculant is a polymeric flocculent which contains a copolymer having alkoxyalkyl units or a poly-(alkylene oxide) unit and further having water-soluble monomer units; and the method of sludge dewatering includes adding the polymeric flocculant to a sludge after or without adding an inorganic flocculent or an organic cationic compound thereto and then dewatering the sludge.

17 Claims, No Drawings

POLYMERIC FLOCCULANT AND METHOD OF SLUDGE DEHYDRATION

TECHNICAL FIELD

The present invention relates to a polymeric flocculant which is for use in flocculation in sludges resulting from municipal sewage, industrial wastewaters, and the like and attains a high dewatering efficiency, and to a method of sludge dewatering with the flocculent. The invention falls under techniques for producing chemical products and techniques for wastewater/sludge treatment.

BACKGROUND OF THE INVENTION

Various flocculants have hitherto been widely used for the flocculation/dewatering of sludges resulting from municipal sewage, industrial wastewaters, and the like.

For example, a method which comprises using poly(iron sulfate) as an inorganic flocculant, adding a nonionic, anionic, or cationic polymeric flocculent alone thereto to form flocs, and dehydrating the flocs (Japanese Patent Laid-Open No. 51998/1983) and a method of sludge dewatering which comprises using an inorganic flocculant and an amphoteric polymeric flocculant having a cationic nature and an anionic nature (Japanese Patent Laid-Open No. 16599/1984) have been proposed. Other techniques include a method comprising adding an inorganic flocculent, subsequently adjusting the pH to 5 to 8, and adding an amphoteric polymeric flocculant thereto (Japanese Patent Laid-Open No. 158200/1988).

Furthermore, known from long ago are a flocculent characterized by comprising a polymer salt consisting of a poly(carboxylic acid) which is partly or wholly in the form of a salt with a cationic surfactant having 6 or more carbon atoms (Japanese Patent Publication No. 1729/1967) and a flocculant comprising an anionic copolymer comprising as essential components acrylic acid and an alkyl acrylate, e.g., methyl acrylate (Japanese Patent Laid-Open No. 41281/1974). Moreover, a sludge dehydrant comprising an amphoteric copolymer comprising a cationic monomer, an anionic monomer, a water-soluble nonionic monomer, and a hydrophobic acrylic acid derivative having a solubility in water of 1 g or less, e.g., a (meth)acrylic acid alkyl ester having 8 or more carbon atoms, as essential components (Japanese Patent Laid-Open No. 156400/1999) and the like have recently been proposed.

However, there have been cases where even with such various flocculants and dewatering methods, a sufficient effect cannot be obtained depending on the kind of the sludge to be treated.

The techniques for flocculation/dewatering according to the various proposals described above have merits in their own ways and are used. However, with recent changes in the living environment and with the resultant increase in the amount of sludges from municipal sewage and industrial wastewaters, the amount of the flocculants and dehydrants to be used is increasing and this poses a problem. There is hence a strong desire for a flocculant or sludge dehydrant which, when used in a smaller amount, enables efficient flocculation/dewatering, i.e., which has better performance.

The present inventors made investigations in order to provide a flocculant and a method of sludge dewatering which, in sludge dewatering, give flocs having an excellent balance among flocculating strength, filtration rate, and moisture content and which can meet the desire.

DISCLOSURE OF THE INVENTION

As a result of intensive investigations made by the present inventors in order to eliminate the problem described above, it has been found that when a copolymer having alkoxyalkyl units or a poly(alkylene oxide) unit and further having water-soluble-monomer units is used in the dewatering of a sludge, flocs excellent in flocculating strength, moisture content, and filtration rate can be obtained. The inventors have made it possible to provide an excellent novel polymeric flocculant and a method of dewatering with the same. The invention has thus been completed.

BEST MODE FOR CARRYING OUT THE INVENTION

The invention will be explained below in detail.

In this description, an acrylate or methacrylate is referred to as a (meth)acrylate, and acrylamide or methacrylamide is referred to as (meth)acrylamide.

1. Copolymer

The polymeric flocculant of the invention comprises a copolymer having alkoxyalkyl units or a poly(alkylene oxide) unit and further having water-soluble-monomer units. It is a water-soluble copolymer. When the copolymer contains a poly(alkylene oxide) unit, it is in the form of a block copolymer. Examples of the types of arrangement of the polymer units include the AB type, ABA type, graft type, and others.

1) Alkoxyalkyl Units

Examples of the alkoxyalkyl units include ones derived from monomers such as methoxyethyl (meth)acrylate, ethoxyethyl (meth)acrylate, butoxyethyl (meth)acrylate, methoxypropyl (meth)acrylate, methoxybutyl (meth)acrylate, and the like. The copolymer may have units derived from two or more of these. Specific examples of the units include methoxyethyl units, ethoxyethyl units, butoxyethyl units, methoxypropyl units, methoxybutyl units, and the like.

The proportion of the alkoxyalkyl units in the copolymer is preferably such that the proportion of the monomer(s) having an alkoxyalkyl unit is from 0.5 to 40% by mole based on all monomers used.

2) Poly(Alkylene Oxide) Unit

Examples of the poly(alkylene oxide) unit include units derived from monomers such as ethylene oxide, propylene oxide, butylene oxide, and the like. The copolymer may have units derived from two or more of these. Specific examples of the unit include a poly(ethylene oxide) unit, poly(propylene oxide) unit, poly(butylene oxide) unit, and the like.

A block copolymer containing a poly(alkylene oxide) unit can be obtained by using a poly(alkylene oxide) compound containing one or more azo groups (hereinafter referred to as an azo RO initiator) or a poly(alkylene oxide) compound containing a photocleavable group (hereinafter referred to as a photo RO initiator) as a polymerization initiator and radical-copolymerizing one or more water-soluble monomers in an aqueous medium in the presence of the polymerization initiator. By such methods, the target block copolymer can be advantageously produced without posing problems such as gelation, etc.

Preferred examples of the azo RO initiator include compounds having a unit represented by the following formula (1).

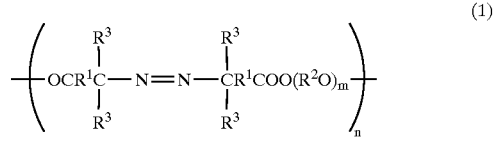

In formula (1), examples of $R^1$ include alkylene groups having 1 to 4 carbon atoms, such as methylene and ethylene;

examples of $R^2$ include alkylene groups having 1 to 4 carbon atoms, such as methylene, ethylene, and propylene; and $R^3$ may be the same or different, and examples thereof include a hydrogen atom, an alkyl group such as methyl, and a cyano group. Symbol m is 10 to 500, and n is 1 to 50, preferably 3 to 20.

Examples of the terminal groups in formula (1) include a hydrogen atom, an alkyl group, and the like.

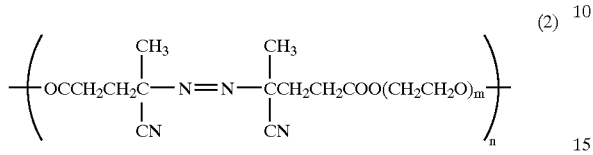
(2)

More preferred of the compounds having a unit represented by formula (1) are compounds represented by formula (2) given above. Symbol m is preferably 40 to 150, and n is preferably 5 to 10.

Preferred examples of the photo RO initiator include compounds having a unit represented by the following formula (3).

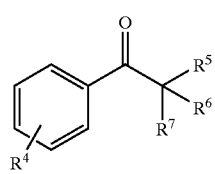
(3)

In formula (3), $R^4$ represents a hydrogen atom, an alkyl group such as methyl or ethyl, a hydroxyl group, a hydroxyalkyl group such as hydroxymethyl or hydroxyethyl, or a poly(alkylene oxide) group.

The poly(alkylene oxide) group is preferably one in which the number of repeating units is from 1 to 100, and is more preferably one in which the number of repeating units is from 10 to 50. Especially preferred examples of the poly (alkylene oxide) group are functional groups represented by the following formula (4).

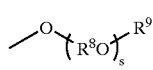
(4)

In formula (4), $R^8$ is an alkylene group having 1 to 4 carbon atoms, such as methylene, ethylene, or propylene; $R^9$ is a hydrogen atom or an alkyl group having 1 to 4 carbon atoms; and s is 1 to 100, preferably 10 to 50.

In formula (3), $R^5$ and $R^6$ may be the same or different, and examples thereof include a hydrogen atom, alkyl groups such as methyl and ethyl, a phenyl group, alkoxy groups having an alkyl group having 1 to 5 carbon atoms, such as methoxy and ethoxy, and cycloalkyl groups such as cyclohexyl. $R^7$ is a hydroxyl group or a poly(alkylene oxide) group. The poly(alkylene oxide) group is preferably one having 1 to 100 repeating units, more preferably one having 10 to 50 repeating units. Especially preferred examples of the poly(alkylene oxide) group are functional groups represented by formula (4) given above. In formula (3), at least either of $R^4$ and $R^7$ should be a poly(alkylene oxide) group. Preferred of the compounds represented by formula (3) are the compounds represented by formulae (5) to (7).

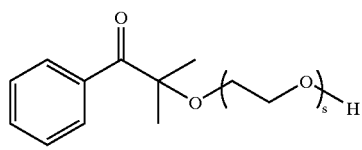
(5)

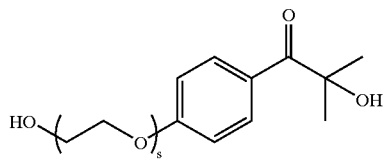
(6)

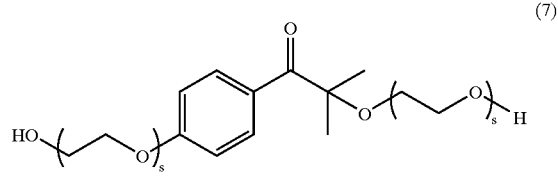
(7)

In the case where the block copolymer is a graft copolymer, it can be obtained by copolymerizing a macromonomer with one or more water-soluble monomers in an aqueous medium. Examples of the macromonomer include: polyalkylene glycols having an ethylenically unsaturated group at one end, such as polyethylene glycol mono(meth) acrylate and polypropylene glycol mono(meth)acrylate; polyalkylene glycols having an ethylenically unsaturated group at one end and an alkoxy group at the other end, such as ω-(meth)acryloyloxypolyethylene glycol monomethyl ether and ω-(meth)acryloyloxypolypropylene glycol monomethyl ether; and the like.

Although the proportion of the poly(alkylene oxide) unit in the block copolymer may be suitably determined according to the desired molecular weight, it is preferably from 0.01 to 30% by weight, more preferably from 0.1 to 20% by weight, especially preferably from 0.5 to 5% by weight. When the proportion thereof is lower than 0.01% by weight, there are cases where the effects of improving filtration rate and reducing moisture content of dewatering cake are insufficient. When it exceeds 30% by weight, there are cases where flocculating strength decreases.

3) Water-Soluble Monomer Units

Examples of the starting monomer(s) used for constituting the water-soluble-monomer units include cationic monomers, anionic monomers, nonionic monomers, and the like. These monomers will be explained below.

(1) Cationic Monomers

Any cationic monomer can be used without limitations as long as it has radical polymerizability. The following compounds may be applied.

Examples thereof include: tertiary salts, e.g., hydrochlorides and sulfates, of dialkylaminoalkyl (meth)acrylates such as dimethylaminoethyl (meth)acrylate, diethylaminoethyl (meth)acrylate, and diethylamino-2-hydroxypropyl (meth)acrylate; tertiary salts, e.g., hydrochlorides and sulfates, of dialkylaminoalkyl(meth)acrylamides such as dimethylaminopropyl(meth)acrylamide; quaternary salts such as halogenoalkyl adducts, e.g., chloromethyl adducts, and halogenoaryl adducts, e.g., chlorobenzyl adducts, of dialkylaminoalkyl (meth)acrylates; quaternary salts such as halogenoalkyl adducts, e.g., chloromethyl adducts, and halogenoaryl adducts, e.g., chlorobenzyl adducts, of dialkylaminoalkyl(meth)acrylamides; and the like.

(2) Anionic Monomer Units

Any anionic monomer also can be used without limitations as long as it has radical polymerizability. The following compounds may be applied.

Examples thereof include unsaturated carboxylic acids and salts thereof. Specific examples include acrylic acid, methacrylic acid, crotonic acid, itaconic acid, maleic acid, and the like. Preferred monomers in the invention are acrylic acid and methacrylic acid.

Examples of the salts of unsaturated acids include ammonium salts and salts of alkali metals such as sodium and potassium.

(3) Nonionic Monomers

Examples of the nonionic monomers include acrylamide, methacrylamide, dimethylacrylamide, diethylacrylamide, methyl acrylate, ethyl acrylate, butyl acrylate, hydroxyethyl acrylate, acrylonitrile, vinyl acetate, and the like.

Those cationic monomers, anionic monomers, and nonionic monomers may be used alone or as a mixture of two or more thereof.

In the case where the copolymer is a copolymer having alkoxyalkyl units, the proportion of the water-soluble monomer units in the copolymer is preferably from 60 to 99.5% by mole based on all monomers. In the case where the copolymer is a copolymer having a poly(alkylene oxide) unit, the proportion of the water-soluble monomer units in the copolymer is preferably from 70 to 99.99% by weight, more preferably from 80 to 99.9% by weight, especially preferably from 95 to 99.5% by weight, based on all monomers. In the water-soluble monomer units constituting the copolymer of the invention, the proportions of the constituent monomers are as follows. The proportion of the units derived from cationic monomers or anionic monomers is preferably from 5 to 100% by mole, and that of the units derived from nonionic monomers is preferably from 10 to 95% by mole.

4) Processes for Producing the Copolymers

The copolymer containing alkoxyalkyl units in the invention can be prepared by known polymerization methods for obtaining a polymer for use as a polymeric flocculent or dehydrant.

A specific example thereof is aqueous solution polymerization. In this method, an aqueous monomer solution having a monomer concentration of from 10 to 80% by weight, preferably from 25 to 60% by weight, is polymerized in the absence of oxygen using a known polymerization initiator at a polymerization initiation temperature of from 0 to 35° C. and a polymerization temperature of 100° C. or lower for from 0.1 to 3 hours to obtain a polymer.

Examples of the polymerization initiator include persulfates such as sodium persulfate and potassium persulfate, organic peroxides such as benzoyl peroxide, azo compounds such as 2,2'-azobis(amidinopropane) hydrochloride, azobiscyanovaleric acid, 2,2'-azobisisobutyronitrile, and 2,2'-azobis[2-methyl-N-(2-hydroxyethyl)propionamide], redox catalysts comprising a combination of hydrogen peroxide or sodium persulfate with sodium bisulfite or ferrous sulfate, and the like.

The block copolymer containing alkylene oxide units in the invention can be prepared by known polymerization methods for obtaining a polymer for use as a polymeric flocculant or dehydrant. Preferred methods include a method in which one or more water-soluble monomers are copolymerized in an aqueous medium in the presence of an azo RO initiator or photo RO initiator.

First, the case in which an azo RO initiator is used will be explained.

A specific example thereof is aqueous solution polymerization. In this method, an aqueous monomer solution having a monomer concentration of from 10 to 80% by weight, preferably from 25 to 60% by weight, is polymerized in the absence of oxygen using an azo RO initiator at a polymerization initiation temperature of from 0 to 35° C. and a polymerization temperature of 100° C. or lower for from 0.1 to 10 hours to obtain a polymer.

In this case, a combination with a polymerization initiator other than azo RO initiators can also be used according to need. Examples thereof include the persulfates, organic peroxides, azo compounds, and redox catalysts mentioned above and the like.

Polymerization with ultraviolet may be conducted. For example, a photopolymerization initiator of the ketal type, acetophenone type, or another type may be used.

The amount of the azo RO initiator to be used may be suitably determined according to the degree of polymerization, viscosity, etc. of the target polymeric flocculent. It is usually preferred to use the azo RO initiator in an amount of from 0.5 to 5% by weight based on the total amount of all monomers and the initiator.

In the case where the azo RO initiator is used in combination with another kind of initiator, the latter initiator is preferably one having a ten-hour half-life temperature higher than the half-life temperature of the azo RO initiator. In case where an initiator having a lower half-life temperature is used, the result is a reduced block copolymer proportion, leading to poor effects of the invention.

The case in which a photo RO initiator is used will be explained next.

Specifically, the target block copolymer can be obtained in the same manner as in the process using an azo RO initiator described above, except that the polymerization initiator is replaced with a photo RO initiator and polymerization is initiated by light irradiation at an intensity of from 0.5 to 1,000 W/m$^2$.

In this case, the reaction may be conducted either batchwise or continuously.

The amount of the photo RO initiator to be used may be suitably determined according to the degree of polymerization, viscosity, etc. of the target polymeric flocculant. It is usually preferred to use the photo RO initiator in an amount of from 0.05 to 5% by weight based on the total amount of all monomers.

In the case where the photo RO initiator is used in combination with another kind of initiator, the latter initiator is preferably one having a ten-hour half-life temperature higher than the half-life temperature of the azo RO initiator as in the case of the azo RO initiator for the same reason as described above.

By conducting polymerization in the manner described above, a high-molecular water-soluble copolymer having an average molecular weight of from several millions to ten-odd millions can be obtained. However, the water-soluble copolymer of the invention is preferably one which has a 0.5% salted viscosity, as determined by the following method, of from 5 to 200 mPa·s and a 0.1% insoluble content, as determined by the following method, of 5 mL or lower after washing.

0.1% Insoluble Content:

A copolymer is dissolved in pure water to prepare 400 ml of a 0.1% by weight (on a solid basis) solution. This solution is wholly filtered through an 83-mesh sieve having a diameter of 20 cm. The insoluble matter remaining on the sieve is collected and the volume thereof is measured.

0.5% Salted Viscosity:

A copolymer is dissolved in 0.4% by weight aqueous sodium chloride solution to prepare a 0.5% by weight solution of the copolymer. The viscosity of the copolymer solution is measured with a Brookfield viscometer after 5 minutes at 25° C. and 60 rpm.

The copolymer obtained by aqueous solution polymerization is usually in a gel state. It is chopped by a known technique, dried with a conveyor belt dryer, far-infrared dryer, or the like at a temperature of about from 60 to 100° C., and ground with a roll grinder or the like to give a powdery copolymer, which is subjected to use as a polymeric flocculant after particle size regulation or addition of, e.g., an additive thereto.

At the time of use, the polymeric flocculant of the invention may be mixed with a known additive such as sodium hydrogen sulfate, sodium sulfate, or a sulfamic acid as long as this does not adversely influence dewatering treatment.

2. Method of Sludge Dewatering

When added to various sludges, the polymeric flocculant of the invention forms flocs having an excellent balance among flocculating strength, filtration rate, and moisture content. There are no particular methods for addition to sludges and for floc formation, and methods in current use may be applied satisfactorily.

The sludges to which the flocculant can be applied are not particularly limited. Examples thereof include sludges resulting from the treatment of domestic sewage, sludges resulting from the treatment of wastewaters from the food industry, sludge resulting from the treatment of wastewaters from the chemical industry, sludges resulting from the treatment of piggery wastewaters, sludges from the pulp or paper manufacturing industry, and the like.

Although the polymeric flocculant of the invention can be used alone, it may be used in combination with an inorganic flocculant or an organic cationic compound. Examples of the inorganic flocculant include aluminum sulfate, poly (aluminum chloride), ferric chloride, poly(iron sulfate), and the like. Examples of the organic cationic compound include polymer polyamines, polyamidines, cationic surfactants, and the like. Especially when the polymeric floccuflent of the invention is an amphoteric polymeric flocculant, a method in which the polymeric flocculant of the invention is added to a sludge to which an inorganic flocculant has been added is a more effective method of dewatering. In this case, it is preferred that after the addition of an inorganic flocculant, the pH be regulated to 4 to 8, more preferably 5 to 7.

The amount of the polymeric flocculant of the invention to be added to a sludge is generally from 0.1 to 3% based on the dry solid components of the sludge, and is preferably from 0.2 to 2% based on the dry solid components of the sludge. In case where the amount thereof is smaller than 0.1%, the recovery of suspended substances from the sludge is insufficient. Even when the flocculant is used in an amount exceeding 3%, no improvement in effect is observed.

The flocs formed can be dehydrated with a dehydrating apparatus such as a screw press dehydrator, belt press dehydrator, filter press dehydrator, or screw decanter to give a dewatering cake.

The flocculant of the invention is applicable also to a method of dewatering with a granulating concentration tank having a filtration part.

Specific examples thereof include the following method. An inorganic flocculant is added to a sludge, and this sludge is introduced into a granulating concentration tank having a filtration part after the polymeric flocculant is added thereto or together with the polymeric flocculant. The filtrate is taken out of the filtration part and, simultaneously therewith, granulation is conducted. The granules are dehydrated with a dehydrator.

EXAMPLES

The invention will be explained below in more detail by reference to Examples and Comparative Examples.

Example 1

Methoxyethyl acrylate (hereinafter referred to as MEA), an aqueous solution of the quaternary methyl chloride salt of dimethylaminoethyl acrylate (hereinafter referred to as DAC), and an aqueous solution of acrylamide (hereinafter referred to as AM) were introduced into a Dewar vessel made of stainless steel in a proportion of 5.0/60.0/35.0 in terms of mol %, and distilled water was added thereto so as to result in a total weight of 1 kg and an overall monomer concentration of 47% by weight. Subsequently, the temperature of the solution was regulated to 15° C. while bubbling nitrogen gas into the solution for 60 minutes to thereby obtain an aqueous monomer mixture solution for polymerization.

Subsequently, cupric chloride, azobisamidinopropane hydrochloride (trade name V-50; manufactured by Wako Pure Chemical Ltd.) as a polymerization initiator, and sodium hydrogen sulfite ($NaHSO_3$) were added in amounts of 0.3 ppm in terms of copper ions, 1,000 ppm, and 30 ppm, respectively, based on the weight of all monomers to initiate polymerization. The polymerization was continued for 1 hour in a stationary state. Thereafter, the resulting water-soluble copolymer in an aqueous gel form was taken out of the Dewar vessel and chopped. The gel chopped was dried at 80° C. for 5 hours and then pulverized to obtain the target polymeric flocculant.

Examples 2 to 4 and Comparative Examples 1 and 2

Polymeric flocculants were obtained in the same manner as in Example 1, except that the monomers, polymerization initiator, etc. were changed to the conditions shown in Table 1. The polymeric flocculants obtained were examined for 0.1% insoluble content and 0.5% salted viscosity, and the results are shown in Table 1. In the table, AA indicates acrylic acid.

TABLE 1

|  | Example | | | | Comparative Example | |
| --- | --- | --- | --- | --- | --- | --- |
|  | 1 | 2 | 3 | 4 | 1 | 2 |
| Polymeric flocculant | A | B | C | D | F | G |
| MEA | 5 | 10 | 15 | 5 | 0 | 0 |
| DAC | 60 | 60 | 60 | 30 | 60 | 30 |
| AM | 35 | 30 | 25 | 35 | 40 | 40 |
| AA | 0 | 0 | 0 | 30 | 0 | 30 |
| Monomer concentration (wt %) | 47 | 47 | 47 | 36 | 47 | 36 |
| Polymerization initiation temperature (° C.) | 15 | 15 | 15 | 15 | 15 | 15 |
| Copper(II) (ppm) | 0.3 | 0.3 | 0.3 | 0.3 | 0.3 | 0.3 |
| V-50 (ppm) | 1000 | 1000 | 1000 | 1000 | 1000 | 1000 |
| $NaHSO_3$ (ppm) | 30 | 40 | 40 | 10 | 40 | 10 |
| 0.5% Salted viscosity (mPa · s) | 30 | 30 | 34 | 51 | 31 | 51 |
| 0.1% Insoluble content (ml) | 0 | 0 | 0 | 1 | 0 | 1 |

Examples 5 to 7 and Comparative Example 3

200 ml of a raw sludge (SS, 13,500 mg/l; VSS, 9,500 mg/l) obtained from municipal sewage was placed in a 300 ml beaker. Any of the polymeric flocculants synthesized in Examples 1 to 3 and Comparative Example 1 was added thereto. The resulting mixture was stirred with a jar tester at 200 rpm for 1 minute to form sludge flocs. The particle diameters of the flocs were measured.

Thereafter, the sludge floc dispersion was gravitationally filtered through an 80-mesh net as a filter. The volume of the filtrate was measured after 10 seconds and this found value is shown as filtration rate. The cake obtained was compressively dewatered with a belt press to determine the moisture content. The results of these measurements are shown in Table 2.

Example 8 and Comparative Example 4

200 ml of a sludge mixture (SS, 23,500 mg/l; VSS, 8,350 mg/l) consisting of a coagulated sludge and an excess sludge both obtained from a wastewater from a chemical factory was placed in a 300 ml beaker. Poly(ferric sulfate) was added thereto until the pH became 4.5. Either of the polymeric flocculants prepared in Example 4 and Comparative Example 2 was added thereto. The resulting mixture was stirred with a jar tester at 150 rpm for 2 minutes to form sludge flocs.

Subsequently, the sludge was stirred with a handy mixer at 560 rpm for 15 seconds, and the particle diameters of the flocs formed were then measured.

Thereafter, the sludge floc dispersion was gravitationally filtered through an 80-mesh net as a filter. The volume of the filtrate was measured after 10 seconds and this found value is shown as filtration rate. The cake obtained from the sludge through filtration was dewatered with a centrifugal separator under the conditions of 2,000 rpm and 10 minutes to determine the moisture content. The results of these measurements are shown in Table 2.

TABLE 2

|  | Example |  |  |  | Comparative Example |  |
|---|---|---|---|---|---|---|
|  | 5 | 6 | 7 | 8 | 3 | 4 |
| Polymeric flocculant | A | B | C | D | F | G |
| Optimal flocculant amount (ppm) | 100 | 100 | 100 | 200 | 100 | 200 |
| Floc diameter (mm) | 3–6 | 3–6 | 4–7 | 2–4 | 3–6 | 2–3 |
| Filtration rate (ml/10 sec) | 118 | 152 | 156 | 130 | 130 | 120 |
| Moisture content of floc (wt %) | 70.5 | 70.1 | 68.5 | 79.5 | 71.5 | 79.4 |

As apparent from the Examples 5 to 7 and Comparative Example 3 shown in Table 2, the moisture content decreased as the amount of MEA units in the polymeric flocculant increased. It was further found that the MEA amounts not smaller than 10% by weight resulted not only in a reduced moisture content but in a significantly increased filtration rate.

It was found from Example 8 and Comparative Example 4 that the incorporation of 5 mol % MEA into a polymeric flocculant resulted in a satisfactory balance between filtration rate and moisture content.

Example 9

An aqueous DAC solution and an aqueous AM solution were introduced into a Dewar vessel made of stainless steel in a proportion of 60.0/40.0 in terms of mol %, and distilled water was added thereto so as to result in a total weight of 1 kg and an overall monomer concentration of 46% by weight. Subsequently, the temperature of the solution was regulated to 15° C. while bubbling nitrogen gas into the solution for 60 minutes to thereby obtain an aqueous monomer mixture solution for polymerization.

Subsequently, cupric chloride, an azo RO initiator [trade name VPE-0201; manufactured by Wako Pure Chemical Industries, Ltd.; a compound represented by formula (2) given above wherein m is about 40 to 50 and n is about 5 to 10], and sodium hydrogen sulfite (NaHSO$_3$) were added in amounts of 0.3 ppm in terms of copper ions, 1.4% by weight, and 70 ppm, respectively, based on the weight of all monomers to initiate polymerization. The polymerization was continued for 1 hour in a stationary state. Thereafter, the resulting water-soluble copolymer in an aqueous gel form was taken out of the Dewar vessel and chopped. The gel chopped was dried at 80° C. for 5 hours and then ground to obtain the target polymeric flocculant.

The polymeric flocculant obtained was examined for 0.1% insoluble content and 0.5% salted viscosity. The results of these measurements are shown in Table 3.

Examples 10 to 13 and Comparative Examples 5 to 7

Polymeric flocculants were produced in the same manner as in Example 10, except that the monomers, polymerization initiator, etc. were changed to the conditions shown in Table 3.

The polymeric flocculants obtained were examined for 0.1% insoluble content and 0.5% salted viscosity. The results of these measurements are shown in Table 3. In the table, DMC indicates the quaternary methyl chloride salt of dimethylaminoethyl methacrylate, AA indicates acrylic acid, and V-50 indicates azobisamidinopropane hydrochloride [manufactured by Wako Pure Chemical Ltd.].

TABLE 3

|  | Example |  |  |  |  | Comparative Example |  |  |
|---|---|---|---|---|---|---|---|---|
| Polymeric | 9 | 10 | 11 | 12 | 13 | 5 | 6 | 7 |
| Flocculant | A | B | C1 | C2 | C3 | RA | RB | RC |
| DAC | 60.0 | 0.0 | 35.0 | 35.0 | 35.0 | 60.0 | 0.0 | 35.0 |
| DMC | 0.0 | 100.0 | 0.0 | 0.0 | 0.0 | 0.0 | 100.0 | 0.0 |
| AA | 0.0 | 0.0 | 5.0 | 5.0 | 5.0 | 0.0 | 0.0 | 5.0 |
| AM | 40.0 | 0.0 | 60.0 | 60.0 | 60.0 | 40.0 | 0.0 | 60.0 |
| Monomer concentration (wt %) | 46 | 75 | 36 | 36 | 36 | 47 | 75 | 36 |
| Polymerization initiation temperature (° C.) | 15 | 15 | 15 | 15 | 15 | 15 | 15 | 15 |
| Copper(II) (ppm) | 0.3 | 0.3 | 0.3 | 0.3 | 0.3 | 0.3 | 0.3 | 0.3 |
| VPE-0201 (wt %) | 1.40 | 0.70 | 1.40 | 1.40 | 0.70 | 0 | 0 | 0 |
| V-50 (ppm) | 0 | 0 | 0 | 100 | 500 | 1000 | 1000 | 1000 |
| NaHSO$_3$ (ppm) | 70 | 80 | 35 | 25 | 15 | 30 | 60 | 10 |
| 0.5% Salted viscosity (mPa · s) | 26 | 17 | 66 | 65 | 66 | 30 | 19 | 78 |
| 0.1% Insoluble content (ml) | 0 | 0 | 0 | 0 | 0 | 0 | 0 | 0 |

Example 14

DAC, AM, and AA were introduced into a vessel made of glass in a proportion of 35.0/5.0/60.0 in terms of mol %, and distilled water was added thereto so as to result in a total weight of 1 kg and an overall monomer concentration of 36% by weight. Subsequently, the temperature of the solution was regulated to 15° C. while bubbling nitrogen gas into the solution for 60 minutes to thereby obtain an aqueous monomer mixture solution for polymerization.

Subsequently, the photo RO initiator represented by formula (5) given above (n=20) was added thereto in an amount of 1,200 weight ppm of all monomers. Using a 100-W black light, the resultant mixture was irradiated from over the reactor at an irradiation intensity of 6.0 mW/cm$^2$ for 60 minutes to conduct polymerization. Thereafter, the resultant water-soluble copolymer in an aqueous gel form was taken out of the Dewar vessel and chopped. The gel chopped was dried at 80° C. for 5 hours and then ground to obtain the target polymeric flocculant C4.

The polymeric flocculent obtained was examined for 0.1% insoluble content and 0.5% salted viscosity. The results of these measurements are shown in Table 4.

Example 15

A polymeric flocculant B2 was obtained in the same manner as in Example 14, except that the monomers, polymerization initiator, etc. were changed to the conditions shown in Table 4.

The polymeric flocculant obtained was examined for 0.1% insoluble content and 0.5% salted viscosity. The results of these measurements are shown in Table 4.

TABLE 4

|  | Example | |
| --- | --- | --- |
|  | 14<br>C4 | 15<br>B2 |
| Polymeric flocculant |  |  |
| DAC | 35.0 | 0.0 |
| DMC | 0.0 | 100.0 |
| AA | 5.0 | 0.0 |
| AM | 60.0 | 0.0 |
| Monomer concentration (wt %) | 36 | 75 |
| Polymerization initiation temperature (° C.) | 15 | 15 |
| Copper(II) (ppm) | 0.0 | 0.0 |
| VPE-0201 (wt %) | 0.0 | 0.0 |
| V-50 (ppm) | 0.0 | 0.0 |
| NaHSO$_3$ (ppm) | 0.0 | 0.0 |
| Photo RO initiator (ppm) | 1200 | 600 |
| 0.5% Salted viscosity (mPa · s) | 70 | 15 |
| 0.1% Insoluble content (ml) | 0 | 0 |

Example 16 and Comparative Example 8

100 ml of a raw sludge mixture (SS, 15,500 mg/l; VSS, 12,400 mg/l) obtained from municipal sewage was placed in a 300 ml beaker. Either of the polymeric flocculants produced in Example 9 and Comparative Example 5 was added thereto. The resulting mixture was stirred with a stirrer at 1,000 rpm for 30 seconds to form sludge flocs. The particle diameters of the flocs were measured.

Thereafter, the sludge floc dispersion was gravitationally filtered through an 80-mesh net as a filter. The volume of the filtrate was measured after 10 seconds and this found value is shown as filtration rate. The cake obtained was dehydrated with a centrifugal separator (4,000 rpm) for 1 minute to determine the moisture content. The results of these measurements are shown in Table 5 and Table 6.

Example 17 and Comparative Example 9

200 ml of a raw sludge mixture (SS, 18,900 mg/l; VSS, 14,300 mg/l) obtained from municipal sewage was placed in a 300 ml beaker. Any of the polymeric flocculants produced in Example 10, Example 15, and Comparative Example 6 was added thereto. The resulting mixture was stirred with a stirrer at 200 rpm for 60 seconds to form sludge flocs. The particle diameters of the flocs were measured.

Thereafter, the sludge floc dispersion was gravitationally filtered to determine the filtration rate in the same manner as in Example 14. The cake obtained was compressively dehydrated with a mini-belt press (areal pressure, 0.5 kg/cm$^2$; three times) to determine the moisture content. The results of these measurements are shown in Table 5 and Table 6.

Examples 18 to 21 and Comparative Example 10

500 ml of a sludge (SS, 31,900 mg/l; VSS, 19,100 mg/l) obtained from a wastewater from the paper manufacturing/pulp industry was placed in a 1 liter beaker. Aluminum sulfate was added thereto in an amount of 3% by weight (based on the SS). Thereafter, any of the polymeric flocculants produced in Examples 11 to 14 and Comparative Example 7 was added thereto. The resulting mixture was stirred with a stirrer at 100 rpm for 90 seconds to form sludge flocs. The particle diameters of the flocs were measured.

Thereafter, the sludge floc dispersion was gravitationally filtered to determine the filtration rate in the same manner as in Example 16. The cake obtained was compressively dehydrated in the same manner as in Example 1 to determine the moisture content. The results of these measurements are shown in Table 5 and Table 6.

TABLE 5

|  | Example | | | | | | |
| --- | --- | --- | --- | --- | --- | --- | --- |
|  | 16 | 17 | 18 | 19 | 20 | 21 | 22 |
| Polymeric flocculant | A | B | C1 | C2 | C3 | B2 | C4 |
| Optimal flocculant amount (ppm) | 140 | 100 | 50 | 50 | 50 | 100 | 50 |
| Floc diameter (mm) | 2–4 | 3–5 | 3–4 | 3–4 | 2–4 | 3–5 | 3–4 |
| Filtration rate (ml/10 sec) | 55 | 136 | 150 | 143 | 135 | 132 | 152 |
| Moisture content of floc (wt %) | 84.7 | 74.7 | 66.1 | 66.5 | 66.5 | 74.0 | 66.0 |

TABLE 6

|  | Comparative Example | | |
| --- | --- | --- | --- |
|  | 8 | 9 | 10 |
| Polymeric flocculant | RA | RB | RC |
| Optimal flocculant amount (ppm) | 140 | 100 | 50 |
| Floc diameter (mm) | 2–4 | 3–4 | 3–4 |
| Filtration rate (ml/10 sec) | 45 | 111 | 120 |
| Moisture content of floc (wt %) | 86.7 | 76.0 | 66.9 |

As apparent from comparisons between Example 16 and Comparative Example 8, between Examples 17 and 21 and Comparative Example 9, and between Examples 18 to 20 and 22 and Comparative Example 10, the polymeric flocculent of each Example attained an excellent filtration rate and a reduced moisture content of flocs as compared with the polymeric flocculants of the Comparative Examples. Incidentally, when the moisture content of flocs decreases by 2% by weight, the amount of fuel oil to be used in the later step of incineration can be reduced by 10% by weight.

Industrial Applicability

The polymeric flocculant of the invention produces such an excellent effect in sludge dewatering that it enables the formation of flocs having an excellent balance among flocculating strength, filtration rate, and moisture content.

What is claimed is:

1. A polymeric flocculant which comprises a block copolymer which is produced by copolymerizing one or more water-soluble monomers in an aqueous medium in the presence of a poly(alkylene oxide) compound having one or more azo groups or a poly(alkylene oxide) compound having a photocleavable group.

2. The polymeric flocculant of claim 1, characterized in that the water-soluble-monomers comprise cationic monomers.

3. The polymeric flocculant of claim 1, characterized in that the water-soluble monomers comprise cationic monomers and anionic monomers.

4. A process for producing a block copolymer for use as a polymeric flocculant, characterized by copolymerizing one or more water-soluble monomers in an aqueous medium in the presence of a poly(alkylene oxide) compound having one or more azo groups.

5. A process for producing a block copolymer characterized by copolymerizing one or more water-soluble monomers in an aqueous medium in the presence of a poly(alkylene oxide) compound having a photocleavable group.

6. The polymeric flocculant of claim 1, wherein the poly(alkylene oxide) compound having one or more azo groups has a unit represented by formula (1):

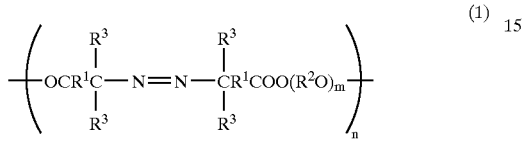

(1)

wherein $R^1$ is an alkylene group having 1 to 4 carbon atoms, $R^2$ is an alkylene group having 1 to 4 carbon atoms, $R^3$ is a hydrogen atom, an alkylene group or an alkyl group, and wherein m is 10 to 500 and n is 1 to 50.

7. The polymeric flocculant of claim 6, wherein n is 3 to 20.

8. The polyermic flocculant of claim 6, wherein the unit is represented by formula (2):

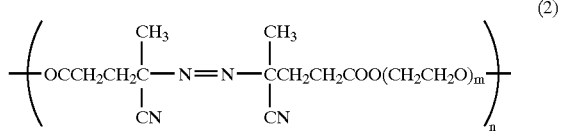

(2)

wherein in is 40 to 150 and n is 5 to 10.

9. The polymeric flocculant of claim 1, wherein the poly(alkylene oxide) compound having a photocleavable group is represented by formula (3):

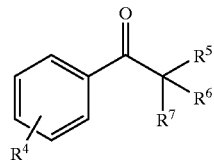

(3)

wherein $R^4$ is a hydrogen atom, an alkyl group, a hydroxyl group, a hydroxyalkyl group or a poly(alkylene oxide) group, $R^5$ and $R^6$ are any of the following, a hydrogen atom, an alkyl group, a phenyl group, an alkoxy group having an alkyl group having 1 to 5 carbon atoms, and a cycloalkyl group, and $R^7$ is a hydroxyl group or a poly(alkylene oxide) group.

10. The polymeric flocculant of claim 9, wherein the poly(alkylene oxide) group has repeating units from 1 to 100.

11. The polymeric flocculant of claim 9, wherein the poly(alkylene oxide) group has repeating units from 10 to 50.

12. The polymeric flocculant of claim 9, wherein the poly(alkylene oxide) group is represented by formula 4:

(4)

wherein $R^8$ is an alkylene group having 1 to 4 carbon atoms and $R^9$ is a hydrogen atom or an alkyl group having 1 to 4 carbon atoms and s is 1 to 100.

13. The polymeric flocculant of claim 12, wherein s is 10 to 50.

14. The polymeric flocculant of claim 9, wherein $R^4$ or $R^7$ is a poly(alkylene oxide) group.

15. The polymeric flocculant of claim 1, wherein the poly(alkylene oxide) unit in the block copolymer is from 0.01 to 30% by weight.

16. The polymeric flocculant of claim 1, wherein the poly(alkylene oxide) unit in the block copolymer is from 0.1 to 20% by weight.

17. The polymeric flocculant of claim 1, wherein the poly(alkylene oxide) unit in the block copolymer is from 0.5 to 5% by weight.

* * * * *